Patented Sept. 25, 1945

2,385,679

UNITED STATES PATENT OFFICE 2,385,679

METHOD OF PREPARING A MOLDED ZEIN ARTICLE AND THE RESULTING ARTICLE

Sara Jordan Bers, Lancaster, Pa., assignor to Armstrong Cork Company, Lancaster, Pa., a corporation of Pennsylvania No Drawing. Application November 27, 1943, Serial No. 512,032

12 Claims. (Cl. 106—152)

My invention relates to zein molding and is primarily concerned with formation of molded zein articles which are characterized by being substantially insoluble in alcohol.

It is well-known that zein molding compositions may be prepared comprising zein, a thermoplastic, non-aldehyde, reactive, modifying resin, and with an aldehyde or aldehyde-liberating substance for insolubilizing only the zein. Fillers may or may not be used. Zein is one of the relatively few proteins which is characterized by being soluble in 80% ethyl alcohol and, in general, the thermoplastic modifying resins which are compatible with zein are also alcohol soluble. For example, rosin has been used as a modifying resin for zein, but even though the zein is insolubilized by an aldehyde, the rosin is not chemically altered so that the resultant product is materially affected by alcohol. Thus, rosin and other normally alcohol-soluble, thermoplastic resins cannot be used in such molding compositions when the product may be employed in the presence of alcohol as the product is deleteriously affected and may entirely disintegrate.

Accordingly, a primary object of this invention is to provide a zein molding composition including a normally alcohol-soluble, thermoplastic modifying resin and an aldehyde that can be readily molded under heat and pressure in a short molding cycle to produce a reaction product which is resistant to alcohol and water.

I have discovered that it is possible to mold in a relatively short molding cycle a composition comprising zein, the substantially gasoline-insuluble fraction of pine wood resin, and paraformaldehyde to produce a molded reaction product having among other desirable characteristics, relatively high resistance to ethyl alcohol even though both the zein and the pine wood resin normally are soluble in alcohol. This pine wood resin surprisingly is sufficiently reacted chemically in the short molding cycle of from about two to about five minutes to form a substantially alcohol-insoluble product when included in the zein molding compositions herein described.

Zein is a well-known, normally alcohol-soluble protein derived from corn. While other proteins, such as bone glue, are insolubilized by aldehyde or aldehyde-liberating substances, for example, benzaldehyde, furfural, paraldehyde, paraformaldehyde, hexamethylenetetramine, and the like, zein is peculiarly adaptable for my purposes and I have been unable to obtain equal results with other proteins.

Paraformaldehyde is the only aldehyde with which I have been able to obtain satisfactory results for I have discovered that other aldehydes and aldehyde-liberating compounds, such as benzaldehyde, paraldehyde, furfural, and hexamethylenetetramine do not produce satisfactory or equivalent products. The reasons for this are not fully understood, especially in view of the general prior art teaching that all of these compounds substantially are equivalents for insolubilizing zein and other proteins.

Not all natural resins or even all wood rosins may be employed, for it has been discovered that only a certain fraction of pine wood resin may be employed. This last mentioned fraction of pine wood resin is characterized by being substantially insoluble in gasoline and may be prepared by chipping pine wood, preferably Southern long leaf pine stump wood, steaming and extracting with a coal tar hydrocarbon, such as benzol, evaporating the solvent, and removing the turpentine and pine oil by distillation. The residue is extracted, preferably at an elevated temperature, with a petroleum hydrocarbon, such as gasoline, petroleum ether, or the like, to remove the FF rosin. After this extraction, a dark colored resinous substance remains which, when freed from occluded gasoline, constitutes a pine wood resin. This resinous substance is characterized by substantial insolubility in gasoline through a minor fraction, about 15%, that is gasoline-soluble may be present after the gasoline extractions.

In general, the proportions of the ingredients are not critical. Sufficient paraformaldehyde must be included to react with and substantially insolubilize both the zein and the pin wood resin. I have found that from about 5% to about 10% by weight of paraformaldehyde is sufficient and produces satisfactory results. An increase in the percentage of pine wood resin tends to cause an increase in the percentage of paraformaldehyde required.

The zein and pine wood resin may be used in widely varying proportions. In general, the higher the percentage of zein, the tougher the product, whereas an increase in the amount of pine wood resin tends to produce a product which is less tough and more brittle. I have obtained excellent results when using from one to four parts of zein for each part of resin. Especially when fillers are used, a sufficient amount of pine wood resin must be used to obtain the desired fluxing or flow characteristics of the binder. I have found that from about one to three parts of zein to one part of pine wood resin forms satisfactory filler-containing products, though it should be understood that other proportions of zein and pine wood resin may be used, either with or without fillers depending upon the characteristics desired.

Relatively small amounts of solvent plasticizers may be included in my compositions, though they tend to increase the alcohol solubility of the products which is undesirable.

These and other objects and advantages will become more apparent from the following detailed description in which all parts and percentages are by weight unless otherwise set forth.

Example 1

A molding composition was prepared by thoroughly mixing the following ingredients:

| | Parts |
|---|---|
| Zein | 67 |
| Benzol-soluble, gasoline-insoluble fraction of pine wood resin | 33 |
| Paraformaldehyde | 5 |

These ingredients, after being thoroughly mixed and pilled, were then molded at a pressure of about 4,000 pounds per square inch and a temperature of 150° C., for a period of about five minutes. The product was tough and dark brown in color and only slightly affected by immersion in 80% ethyl alcohol for 48 hours. This immersion test did not materially affect the finish or hardness though it did cause a very slight swelling and loss in weight. Water had no noticeable effect on this molded product.

While the chemical action or reaction is not fully understood, it is apparent that the pine wood resin enters into chemical reaction with one or both of the other binder components which is in addition to the insolubilizing action of the aldehyde on the zein.

If white or pale wood rosin essentially consisting of abietic acid is substituted for the pine wood resin in the above example, the molded product will completely disintegrate when immersed in 80% alcohol leaving a granular residue. Thus, rosin is in no way an equivalent for the substantially gasoline-insoluble pine wood resin.

Example 2

A molding composition was prepared as follows:

| | Parts |
|---|---|
| Zein | 43.4 |
| Benzol-soluble, gasoline-insoluble fraction of pine wood resin | 21.6 |
| Wood flour | 35.0 |
| Paraformaldehyde | 3.96 |
| Zinc stearate (lubricant) | 3.00 |

The zein, pine wood resin and wood flour were mixed and then preheated at a temperature of about 130° C. at atmospheric pressure until a homogeneous crumbly mass was obtained. This crumbly mass was broken up and screened to a more uniform mixture.

The paraformaldehyde and zinc stearate were thoroughly mixed with the screened mixture and molded at a temperature of about 160° C. at a pressure of about 4,000 pounds per square inch for a period from 2 to 3 minutes in a mold formed to produce a molded screw cap of conventional design. This molded closure was readily removed from the mold without dropping the mold temperature. During molding it was found desirable to breath the mold, as is customary, to permit the escape of gases.

This molded closure was hard, tough, and of excellent appearance. It was immersed in ethyl alcohol as described under Example 1 and substantially the same results were obtained.

Example 3

A molded threaded closure was prepared as follows:

| | Parts |
|---|---|
| Zein | 26.7 |
| Substantially gasoline-insoluble fraction of pine wood resin | 13.3 |
| Redwood flour | 60 |
| Paraformaldehyde | 3.4 |
| Zinc stearate | 3 |

These ingredients, after being thoroughly mixed, were molded at a pressure of about 4,000 pounds per square inch and at a temperature of about 160° C. for a period of about 3 to 5 minutes in a mold shaped to form a standard type threaded closure.

The finished closure was dark brown to black in color and had a glossy finish of good appearance. After immersing the closure in 80% ethyl alcohol for 48 hours, it was found that the closure softened and swelled a slight but undesirable amount. This unexpected amount of softening was apparently due to the resinous material in the redwood flour.

A second similar closure was prepared as described above and then baked in an oven at atmospheric pressure for about 48 hours at about 140° C. This baked closure was found to be substantially unaffected by immersion in 80% alcohol for 48 hours. This additional baking step apparently insolubilized either the resinous material in the redwood flour or further insolubilized the pin wood resin or both. The additional baking did not cause distortion or shrinkage.

Any suitable fillers and/or pigments may be used. For example, in addition to the fillers set forth in the above examples, carbon black, cork particles, walnut shell flour, fibrous materials, and the like may be employed in widely varying amounts depending upon the particular characteristics desired. In general, I have found that satisfactory products are formed when up to about 70% by weight of fillers are used, though the amount of filler employed will depend at least in part on the type of filler used and the characteristics desired in the final product. The fillers may be eliminated.

When relatively large amounts of fillers are employed, it is more desirable to "pre-flux" the zein and pine wood resin with or without the fillers to obtain a more intimate and uniform mixture. This pre-fluxing treatment consists in heating these ingredients, without the aldehyde and with or without pressure, to a temperature sufficient to melt the resin. This product is brownish, somewhat translucent if fillers are not present, and of resinous appearance. It may be cooled, ground, and then mixed with the aldehyde.

The temperature and pressure employed in the molding operation will depend in part on the amount of pine wood resin employed and upon the quantity and amount of fillers employed. The presence of a solvent plasticizer, for example, will also affect the molding temperature and pressure. In general, I have found that temperatures above about 120° C. may be employed though I prefer somewhat higher temperatures and normally obtain the most satisfactory results with temperatures in the range of from about 125° C. to about 160° C. A higher temperature tends to shorten the molding cycle and a lower temperature tends to lengthen the cycle. The temperature and time of the molding cycle are such that the binder ingredients react to produce a reaction product which is substantially insoluble in ethyl alcohol.

Having described my invention in detail, it is obvious that modifications may be made therein and that some features may be employed without others, all without departing from the spirit and scope of my invention as defined in the appended claims.

I claim:

1. The method of manufacturing plastic articles comprising the steps of fluxing with heat a mixture of zein and the substantially gasoline-insoluble fraction of pine wood resin, adding sufficient paraformaldehyde to said fluxed mixture to react with substantially all of said zein and resin, heating said mixture to a temperature at which reaction of said paraformaldehyde with said zein and resin occurs, and continuing the application of heat until said paraformaldehyde has reacted with substantially all of said zein and resin and a reaction product is produced which is substantially insoluble in 80% ethyl alcohol.

2. The method of producing molded zein articles from a molding composition comprising zein, the substantially gasoline-insoluble fraction of pine wood resin, and sufficient paraformaldehyde to react with substantially all of said zein and resin, the steps comprising heating in a mold under pressure a mixture of said ingredients to a temperature at which reaction of said paraformaldehyde with said zein and resin occurs, continuing the application of heat until said paraformaldehyde has reacted with substantially all of said zein and resin and a reaction product is produced which is substantially insoluble in 80% ethyl alcohol, and then removing the molded product from the mold.

3. In a method of producing articles from zein and the gasoline-insoluble fraction of pine wood resin, the step of heating a mixture of zein, the substantially gasoline-insoluble fraction of pine wood resin, and sufficient paraformaldehyde to react with substantially all of said zein and resin at a temperature at which reaction of said paraformaldehyde with said zein and resin occurs until said paraformaldehyde has reacted with substantially all of said zein and resin and a reaction product is produced which is substantially insoluble in 80% ethyl alcohol.

4. The method of manufacturing molded articles comprising the steps of heating in a mold under pressure a molding composition comprising zein, the substantially gasoline-insoluble fraction of pine wood resin, and sufficient paraformaldehyde to react with substantially all of said zein and resin to a temperature at which reaction of said paraformaldehyde with said zein and resin occurs, removing the molded product from the mold, and further heating the molded article at said reaction temperature until said paraformaldehyde has reacted with substantially all of said zein and resin and a reaction product is produced which is substantially insoluble in 80% ethyl alcohol.

5. In a method of producing zein articles characterized by substantial insolubility in 80% ethyl alcohol, the step of heating at a temperature above 120° C. a mixture comprising zein, the substantially gasoline-insoluble fraction of pine wood resin, and at least 5% by weight based on the weight of said zein and resin of paraformaldehyde, sufficient to react with substantially all of said zein and resin, for a period of time sufficient to form a reaction product of said paraformaldehyde with substantially all of said zein and resin which is substantially insoluble in 80% ethyl alcohol.

6. The method of manufacturing molded articles characterized by substantial insolubility in 80% ethyl alcohol comprising the step of heating about one part by weight to about four parts by weight of zein and about one part by weight of the substantially gasoline-insoluble fraction of pine wood resin with about 5% to about 10% of paraformaldehyde based on the weight of both the zein and resin at a temperature between about 120° C. to about 160° C. for a period of time sufficient to react substantially all of said zein and resin with said paraformaldehyde and produce a product substantially insoluble in 80% ethyl alcohol.

7. A method in accordance with claim 6 in which the heating is accomplished under about 4,000 pounds per square inch pressure.

8. As a new article of manufacture, a product which is substantially insoluble in 80% ethyl alcohol comprising the reaction product obtained by heating at reaction temperature a mixture of zein and the substantially gasoline-insoluble fraction of pine wood resin with sufficient paraformaldehyde to react with substantially all of said zein and resin until said paraformaldehyde has reacted with substantially all of said zein and resin.

9. A formed article of manufacture comprising filler and a binder which is substantially insoluble in 80% ethyl alcohol and comprises the reaction product obtained by heating at reaction temperature a mixture of zein and the substantially gasoline-insoluble fraction of pine wood resin with sufficient paraformaldehyde to react with substantially all of said zein and resin until said paraformaldehyde has reacted with substantially all of said zein and resin.

10. A formed article of manufacture comprising filler and a binder which is substantially insoluble in 80% alcohol and comprises the reaction product obtained by heating at reaction temperature a mixture of from about one part by weight to about four parts by weight of zein, about one part by weight of the gasoline-insoluble fraction of pine wood resin, and sufficient paraformaldehyde to react with substantially all of said zein and resin until said paraformaldehyde has reacted with substantially all of said zein and resin.

11. A formed article of manufacture comprising filler and a binder which is substantially insoluble in 80% alcohol and comprises the reaction product obtained by heating at reaction temperature a mixture of from about one part by weight to about four parts by weight of zein, about one part by weight of the gasoline-insoluble fraction of pine wood resin, and about 5% to about 10% by weight based on the weight of the zein and resin of paraformaldehyde until said paraformaldehyde has reacted with substantially all of said zein and resin.

12. A molded article characterized by substantial insolubility in 80% ethyl alcohol comprising the product obtained by reacting under pressure about one part by weight to about four parts by weight of zein and about one part by weight of the substantially gasoline-insoluble fraction of pine wood resin with about 5% to about 10% of paraformaldehyde based on the weight of both the zein and the resin at a temperature between about 120° C. to about 160° C. until said paraformaldehyde has reacted with substantially all of said zein and resin.

SARA JORDAN BERS.